(12) United States Patent
Zhong

(10) Patent No.: US 8,657,325 B2
(45) Date of Patent: Feb. 25, 2014

(54) STROLLER WITH ASSISTANT WHEEL

(75) Inventor: Zhi-Ren Zhong, Guangdong (CN)

(73) Assignee: Wonderland Nurserygoods Company Limited, Central (HK)

( * ) Notice: Subject to any disclaimer, the term of this patent is extended or adjusted under 35 U.S.C. 154(b) by 0 days.

(21) Appl. No.: 13/531,571

(22) Filed: Jun. 24, 2012

(65) Prior Publication Data
US 2013/0001925 A1  Jan. 3, 2013

(30) Foreign Application Priority Data

Jun. 30, 2011  (CN) ...................... 2011 2 0227499 U

(51) Int. Cl.
B62B 7/08 (2006.01)

(52) U.S. Cl.
USPC ...................................... 280/642; 280/47.38

(58) Field of Classification Search
USPC .............. 280/9, 642, 638, 35, 639, 647, 648, 280/650, 654, 657, 658, 43.1, 47.131, 280/47.16, 47.2, 47.25, 47.38, 47.4, 47.41
See application file for complete search history.

(56) References Cited

U.S. PATENT DOCUMENTS

| 315,669 | A | * | 4/1885 | Serrell | 280/43.1 |
|---|---|---|---|---|---|
| 1,212,243 | A | * | 1/1917 | O'Hearn | 280/5.32 |
| 2,014,085 | A | * | 9/1935 | Kroll et al. | 188/20 |
| 2,469,909 | A | * | 5/1949 | Wickman et al. | 280/47.41 |
| 2,548,601 | A | * | 4/1951 | Gottfried | 280/649 |
| 3,782,749 | A | * | 1/1974 | Wiczer | 280/641 |
| 3,889,963 | A | * | 6/1975 | Brattgard | 280/650 |
| 4,632,420 | A | * | 12/1986 | Miyagi | 280/642 |
| 5,106,116 | A | * | 4/1992 | Chen | 280/642 |
| 5,291,959 | A | * | 3/1994 | Malblanc | 180/11 |
| 5,294,141 | A | * | 3/1994 | Mentessi et al. | 280/250.1 |
| 5,519,919 | A | * | 5/1996 | Lee | 16/113.1 |
| 5,653,460 | A | * | 8/1997 | Fogarty | 280/642 |
| 5,722,594 | A | * | 3/1998 | Farr et al. | 280/643 |
| 5,725,238 | A | * | 3/1998 | Huang | 280/642 |
| 5,788,260 | A | * | 8/1998 | Huang | 280/645 |
| 5,810,373 | A | * | 9/1998 | Miranda | 280/47.2 |
| 5,873,439 | A | * | 2/1999 | Liang | 190/18 A |
| 5,884,920 | A | * | 3/1999 | Seto | 280/1.5 |
| 5,899,467 | A | * | 5/1999 | Henkel | 280/47.25 |
| 6,082,510 | A | * | 7/2000 | Liang | 190/18 A |

(Continued)

FOREIGN PATENT DOCUMENTS

| CN | 2525000 Y | 12/2002 |
|---|---|---|
| CN | 202169958 U | 3/2012 |

(Continued)

*Primary Examiner* — Katy M Ebner
*Assistant Examiner* — Brodie Follman
(74) *Attorney, Agent, or Firm* — Winston Hsu; Scott Margo

(57) ABSTRACT

The present invention discloses a stroller including a foldable stroller skeleton, a front-wheel assembly and a rear-wheel assembly installed on the foldable stroller skeleton, a frame pivotally connected to the foldable stroller skeleton and an assistant wheel pivotally connected to the frame for being capable of contacting a ground by cooperating with the rear-wheel assembly as the frame approaches the rear-wheel assembly by rendering the foldable stroller skeleton folded. The stroller can be in a standing state so as to facilitate users to carry after being folded. The assistant wheel is rolling as the stroller is dragged so that users can save more effort to drag the stroller. The stroller is standing by the assistant wheel and the rear-wheel assembly, instead of the front-wheel assembly and the rear-wheel assembly.

6 Claims, 4 Drawing Sheets

(56) References Cited

U.S. PATENT DOCUMENTS

| | | | |
|---|---|---|---|
| 6,155,740 A * | 12/2000 | Hartenstine | 403/102 |
| 6,273,451 B1 * | 8/2001 | Julien et al. | 280/642 |
| 6,357,784 B1 * | 3/2002 | Mitzman | 280/642 |
| 6,360,836 B1 * | 3/2002 | Milano et al. | 180/65.6 |
| 6,382,652 B1 * | 5/2002 | Cheng | 280/293 |
| 6,464,244 B1 * | 10/2002 | Cheng | 280/650 |
| 6,474,664 B1 * | 11/2002 | Luttway et al. | 280/47.38 |
| 6,478,327 B1 * | 11/2002 | Hartenstine et al. | 280/642 |
| 6,478,328 B1 * | 11/2002 | Yeh et al. | 280/650 |
| 6,540,239 B2 * | 4/2003 | Lee, Jr. | 280/33.993 |
| 6,666,473 B2 * | 12/2003 | Hartenstine et al. | 280/647 |
| 6,702,306 B1 * | 3/2004 | Ockwell | 280/47.41 |
| 6,761,373 B2 * | 7/2004 | Cheng | 280/650 |
| 6,767,027 B2 * | 7/2004 | Cheng | 280/642 |
| 6,877,760 B2 * | 4/2005 | Wang | 280/642 |
| 6,979,017 B2 * | 12/2005 | Chen | 280/642 |
| 6,981,709 B2 * | 1/2006 | Saint | 280/47.38 |
| 7,011,316 B1 * | 3/2006 | Peridon | 280/30 |
| 7,014,203 B2 * | 3/2006 | Liu | 280/293 |
| 7,044,497 B2 * | 5/2006 | Hartenstine et al. | 280/642 |
| 7,083,174 B2 * | 8/2006 | Kane | 280/47.2 |
| 7,185,910 B2 * | 3/2007 | Beauchesne et al. | 280/650 |
| 7,234,711 B2 * | 6/2007 | Gordon et al. | 280/47.38 |
| 7,237,803 B2 * | 7/2007 | Nguyen | 280/767 |
| 7,278,652 B2 * | 10/2007 | Riedl et al. | 280/642 |
| 7,815,215 B1 * | 10/2010 | Lowe | 280/639 |
| 7,862,069 B2 * | 1/2011 | King | 280/650 |
| 8,033,369 B2 * | 10/2011 | Sherrell et al. | 190/18 A |
| 8,038,165 B2 * | 10/2011 | Wang | 280/304.2 |
| 8,186,705 B2 * | 5/2012 | Greger et al. | 280/643 |
| 8,210,562 B2 * | 7/2012 | Ohnishi | 280/642 |
| 8,419,121 B2 * | 4/2013 | Hu et al. | 297/16.1 |
| 8,500,139 B1 * | 8/2013 | Andrews et al. | 280/32.7 |
| 2002/0005628 A1 * | 1/2002 | Hartenstine et al. | 280/647 |
| 2003/0080536 A1 * | 5/2003 | Hartenstine et al. | 280/642 |
| 2003/0094791 A1 * | 5/2003 | Hartenstine et al. | 280/642 |
| 2003/0209882 A1 * | 11/2003 | Yeh | 280/642 |
| 2004/0041368 A1 * | 3/2004 | Cheng | 280/642 |
| 2004/0041369 A1 * | 3/2004 | Cheng | 280/647 |
| 2004/0090046 A1 * | 5/2004 | Hartenstine et al. | 280/642 |
| 2004/0094935 A1 * | 5/2004 | Fair et al. | 280/642 |
| 2004/0113394 A1 * | 6/2004 | Cheng | 280/647 |
| 2004/0178590 A1 | 9/2004 | Zweideck | |
| 2004/0245748 A1 * | 12/2004 | Wang | 280/642 |
| 2005/0242549 A1 * | 11/2005 | Longenecker et al. | 280/642 |
| 2006/0006629 A1 * | 1/2006 | Riedl et al. | 280/642 |
| 2006/0043698 A1 * | 3/2006 | Bridges | 280/639 |
| 2007/0262565 A1 * | 11/2007 | Bearup et al. | 280/642 |
| 2008/0073879 A1 * | 3/2008 | Chen et al. | 280/642 |
| 2008/0088115 A1 * | 4/2008 | Yang et al. | 280/642 |
| 2008/0164667 A1 * | 7/2008 | Fegler et al. | 280/47.25 |
| 2010/0013196 A1 * | 1/2010 | Katzir et al. | 280/647 |
| 2010/0038886 A1 * | 2/2010 | Greger et al. | 280/642 |
| 2010/0102535 A1 * | 4/2010 | Zhong | 280/650 |
| 2012/0326418 A1 * | 12/2012 | Ohnishi | 280/642 |
| 2013/0001925 A1 * | 1/2013 | Zhong | 280/642 |
| 2013/0075989 A1 * | 3/2013 | Bottazzi | 280/35 |
| 2013/0113189 A1 * | 5/2013 | Doucette et al. | 280/650 |
| 2013/0147161 A1 * | 6/2013 | Chen | 280/642 |
| 2013/0154215 A1 * | 6/2013 | Thomas et al. | 280/47.38 |

FOREIGN PATENT DOCUMENTS

| | | |
|---|---|---|
| EP | 1 591 341 A2 | 11/2005 |
| EP | 1 591 341 A3 | 9/2009 |
| WO | 2007134282 A2 | 11/2007 |
| WO | 2007134282 A3 | 11/2007 |
| WO | 2010125305 A1 | 11/2010 |

\* cited by examiner

STROLLER WITH ASSISTANT WHEEL

BACKGROUND OF THE INVENTION

1. Field of the Invention

The present invention relates to a stroller, and specifically relates to a stroller with an assistant wheel to drag easily.

2. Description of the Prior Art

A stroller facilitates parents to take their baby easily, and it is often designed as a foldable structure for convenient carrying. The stroller is unfolded in use and is folded into a small size for convenient carrying and storage. In order to facilitate users to manipulate the stroller, most of users prefer the stroller standing after being folded so as to facilitate users to carry. Most of conventional strollers in the market are designed to be disposed on the ground after being folded. Therefore, users have to stoop to take the strollers. In addition, even some strollers can stand after being folded, but a front-wheel assembly of the stroller has to unfold forward in a using state. Accordingly, the stroller is too big to drag for users. After the front-wheel assembly is folded together, the stroller is unable to stand so that it is extremely inconvenient for users to carry.

SUMMARY OF THE INVENTION

The purpose of the present invention is to provide a stroller with an assistant wheel which facilitates users to take and drag, and with a small size after being folded, to solve the above problems.

To achieve the above purpose, the present invention includes a foldable stroller skeleton, a front-wheel assembly connected to the foldable stroller skeleton, a rear-wheel assembly connected to the foldable stroller skeleton, a frame connected to the foldable stroller skeleton and an assistant wheel pivotally connected to the frame for being capable of contacting a ground by cooperating with the rear-wheel assembly as the frame approaches the rear-wheel assembly by rendering the foldable stroller skeleton folded.

Preferably, the stroller of the present invention further includes an operating mechanism disposed on the foldable stroller skeleton for unlocking the foldable stroller skeleton prior to rendering the foldable stroller skeleton folded so as to ensure the foldable stroller skeleton to operate reliably.

Preferably, the stroller of the present invention further includes an installing base having a front end fixed to the frame and a rear end pivotally connected to the assistant wheel so that the assistant wheel is more reliably installed on the foldable stroller skeleton. More specifically, the installing base has an engaging slot formed on the front end thereof and a containing slot formed on the rear end thereof, the installing base being fixed to the frame by rendering the frame engaged inside the engaging slot. The assistant wheel is pivotally connected to the installing base and has a portion accommodated inside the containing slot and another portion protrudes outside the containing slot.

Preferably, the foldable stroller skeleton includes a handrail frame, a seat frame arranged to and cooperated with the handrail frame so as to form a seat area, a front-wheel support frame disposed on a front side of the seat area, the front-wheel assembly being connected to the front-wheel support frame, a rear-wheel support frame disposed on a rear side of the seat area, the rear-wheel assembly being connected to the rear-wheel support frame, and a stretchable handle frame. The frame is connected to the seat frame. A lower portion of the stretchable handle frame is disposed on the rear side of the seat area, and an upper portion of the stretchable handle frame extending away from the handrail frame. By the front-wheel support frame, the rear-wheel support frame, the handrail frame, the seat frame and the stretchable handle frame, the foldable stroller skeleton has a small size after being folded. By the frame installing on the seat frame, the assistant wheel approaches the rear-wheel assembly and contacts a ground by cooperating with the rear-wheel assembly as the foldable stroller skeleton is to be folded so that the stroller stands on the ground after being folded. Therefore users can save more effort to drag the stroller of the present invention.

Preferably, the front-wheel assembly includes a plurality of front wheels pivotally connected to the front-wheel support frame. The purpose of this configuration is to bear a force applied on a front end of the stroller in equilibrium so as to facilitate the stroller to steer.

Preferably, the rear-wheel assembly includes a plurality of rear wheels pivotally connected to the rear-wheel support frame. The purpose of this configuration is to bear a force applied on a rear end of the stroller in equilibrium so as to facilitate the stroller of the present invention to steer.

Preferably, the frame is pivotally connected to the foldable stroller skeleton, and the assistant wheel is pivotally connected to the frame for being capable of contacting the ground by cooperating with the rear-wheel assembly as the frame approaches the rear-wheel assembly by rendering the foldable stroller skeleton folded. The configuration makes the stroller be in a standing state so as to facilitate users to carry after the stroller is folded. Besides, the assistant wheel is rolling as the stroller is dragged so that users can save more effort to drag the stroller of the present invention. The stroller is standing by the assistant wheel and the rear-wheel assembly, instead of the front-wheel assembly and the rear-wheel assembly of a conventional stroller. Therefore, the stroller of the present invention is smaller than the conventional one after being folded.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
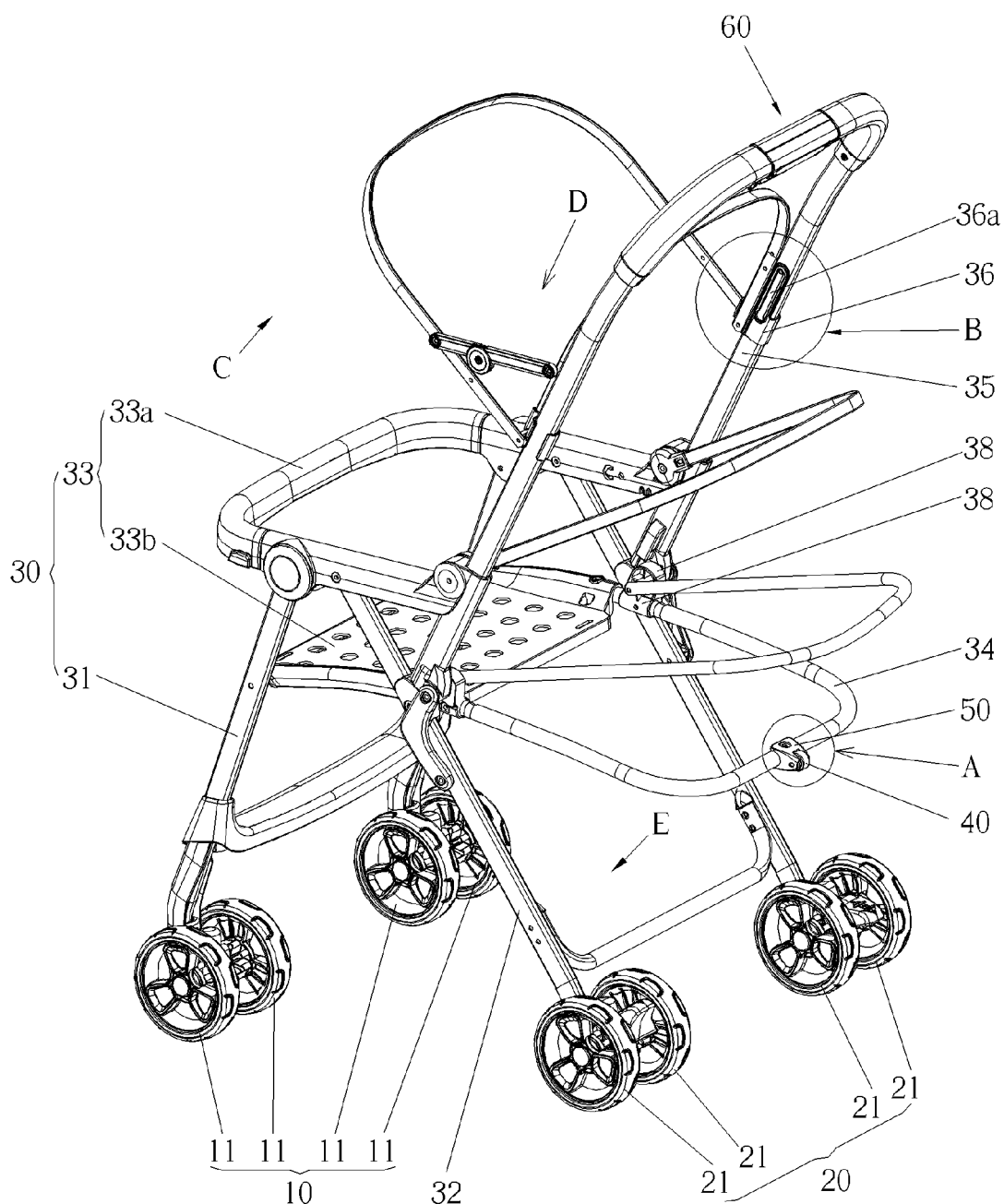
FIG. 1 is a schematic drawing of a stroller according to an embodiment of the present invention.
Figure 2:
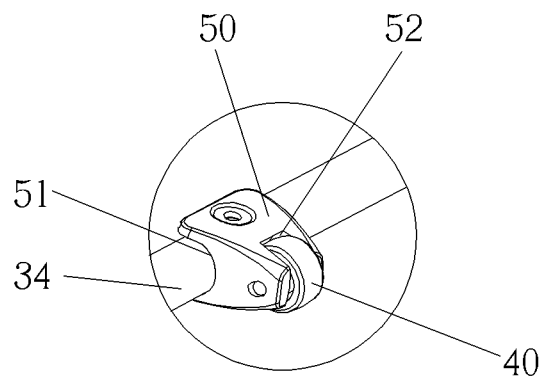
FIG. 2 is a partly enlarged drawing of part A illustrated in FIG. 1 according to the embodiment of the present invention.
Figure 3:
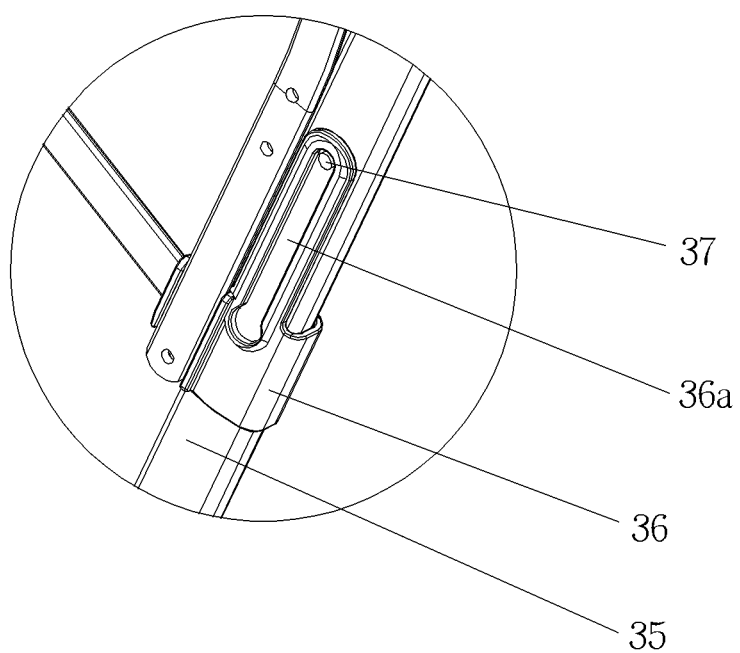
FIG. 3 is a partly enlarged drawing of part B illustrated in FIG. 1 according to the embodiment of the present invention.
Figure 4:
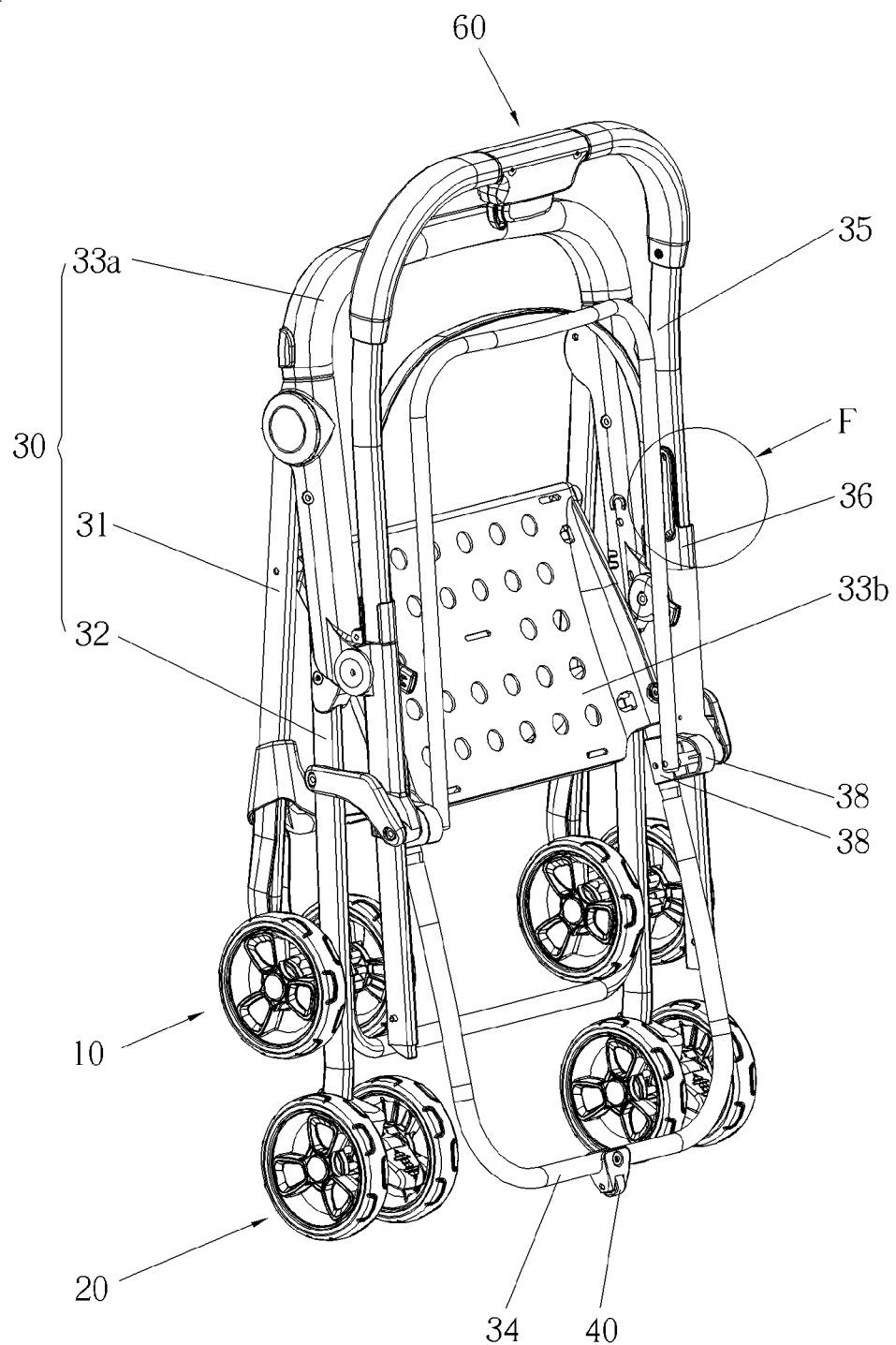
FIG. 4 is a schematic drawing of the stroller after being folded according to the embodiment of the present invention.
Figure 5:
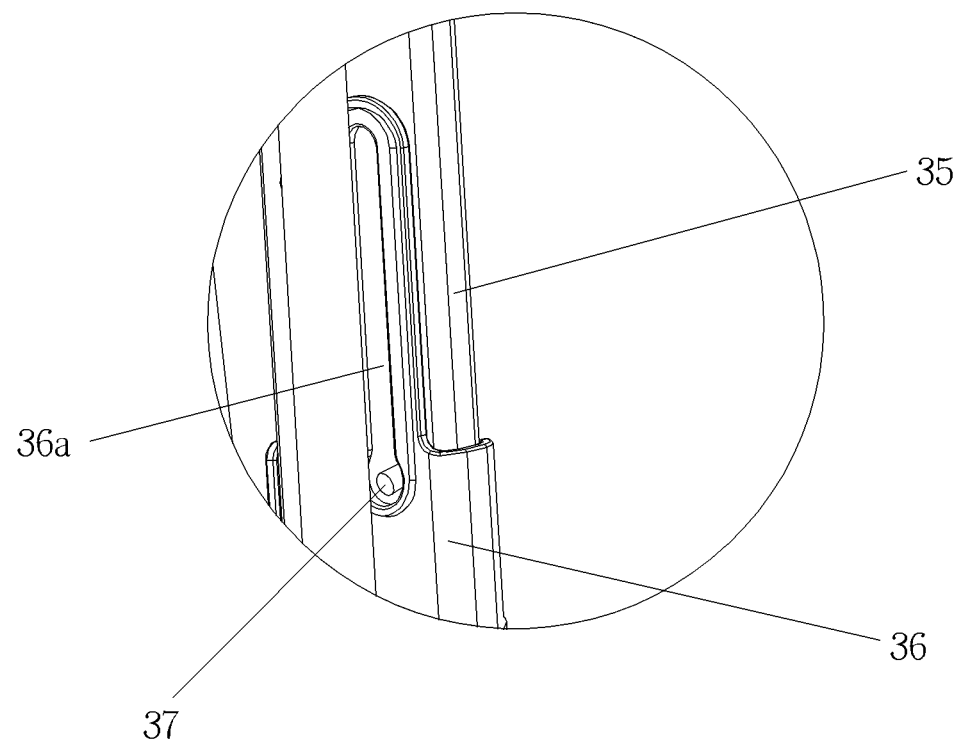
FIG. 5 is a partly enlarged drawing of part F illustrated in FIG. 4 according to the embodiment of the present invention.

Please refer to FIG. 1 to FIG. 5. FIG. 1 is a schematic drawing of a stroller 100 according to an embodiment of the present invention. FIG. 2 is a partly enlarged drawing of part A illustrated in FIG. 1 according to the embodiment of the present invention. FIG. 3 is a partly enlarged drawing of part B illustrated in FIG. 1 according to the embodiment of the present invention. FIG. 4 is a schematic drawing of the stroller 100 after being folded according to the embodiment of the present invention. FIG. 5 is a partly enlarged drawing of part F illustrated in FIG. 4 according to the embodiment of the present invention. The stroller 100 of the present invention includes a front-wheel assembly 10, a rear-wheel assembly 20, an assistant wheel 40, a frame 34, a foldable stroller skeleton 30, a seat tube 38 and an operating mechanism 60. The front-wheel assembly 10 is connected to a front end of a lower portion of the foldable stroller skeleton 30. The rear-wheel assembly 20 is connected to a rear end of the lower portion of the foldable stroller skeleton 30. The frame 34 extends outside the foldable stroller skeleton 30, and the frame 34 is pivotally connected to the foldable stroller skeleton 30 through the seat tube 38. The assistant wheel 40 is pivotally connected to the frame 34. The assistant wheel 40 contacts a ground by cooperating with the rear-wheel assembly 20 as the foldable stroller skeleton 30 is folded to move the assistant wheel 40 to approach the rear-wheel assembly 20. In order to ensure the foldable stroller skeleton 30 to operate more reliably, the operating mechanism 60 disposed on the foldable stroller skeleton 30 is for unlocking the foldable stroller skeleton 30 prior to rendering the foldable stroller skeleton 30 folded. That is, before the foldable stroller skeleton 30 is folded, the operating mechanism 60 has to be operated to unlock the foldable stroller skeleton 30.

In this embodiment, the foldable stroller skeleton 30 further includes a front-wheel support frame 31, a rear-wheel support frame 32, a seat area 33, a handrail frame 33a, a seat frame 33b, a stretchable handle frame 35, a guiding limiting block 36, a guiding groove 36a, and a sliding pillar 37. The seat frame 33b is arranged to and cooperated with the handrail frame 33a to form the seat area 33. The frame 34 is connected to the seat frame 33b to contain a basket, and the assistant wheel 40 is installed on the frame 34. The front-wheel support frame 31 is disposed on a front side of the seat area 33 for connecting the front-wheel assembly 10. The rear-wheel support frame 32 is disposed on a rear side of the seat area 33 for connecting the rear-wheel assembly 20. A lower portion of the stretchable handle frame 35 is disposed on the rear side of the seat area 33, and an upper portion of the stretchable handle frame 35 extends away from the handrail frame 33a. The operating mechanism 60 is installed on the stretchable handle frame 35 for unlocking the foldable stroller skeleton 30 when the foldable stroller skeleton 30 is to be folded.

Please refer to FIG. 3 and FIG. 5. The guiding limiting block 36 is disposed on the stretchable handle frame 35, and the guiding groove 36a is disposed on the guiding limiting block 36. The sliding pillar 37 is disposed on the stretchable handle frame 35 for inserting into the guiding groove 36a. For stretching the stretchable handle frame 35 out, the operating mechanism 60 is operated to unlock the foldable stroller skeleton 30 first. Next, the stretchable handle frame 35 is pulled in a direction opposite to an arrow D as shown in FIG. 1, so that the sliding pillar 37 on the stretchable handle frame 35 slides inside the guiding groove 36a for contacting against an inner wall of a top end of the guiding groove 36a. And then the stretchable handle frame 35 continues being pulled in the direction opposite to the arrow D, so that the stretchable handle frame 35 is pulled out completely. For drawing the stretchable handle frame 35 back, the operating mechanism 60 is operated to unlock the foldable stroller skeleton 30 first. Next, the stretchable handle frame 35 is pushed in a direction of the arrow D as shown in FIG. 1, so that the sliding pillar 37 on the stretchable handle frame 35 slides inside the guiding groove 36a for contacting an inner wall of a bottom end of the guiding groove 36a. And then the stretchable handle frame 35 continues being pushed in the direction of the arrow D, so that the stretchable handle frame 35 is drawn back completely.

The foldable stroller skeleton 30 includes the front-wheel support frame 31, the rear-wheel support frame 32, the handrail frame 33a, the seat frame 33b and the stretchable handle frame 35 to achieve a small size after being folded. The frame 34 is connected to the seat frame 33b to contain the basket. The assistant wheel 40 is installed on the frame 34 for being capable of contacting the ground by cooperating with the rear-wheel assembly 20 as the frame 34 approaches the rear-wheel assembly 20 by rendering the foldable stroller skeleton 30 folded. Therefore, the stroller 100 of the present invention can stand on the ground after being folded so as to facilitate users to save more effort to drag the stroller 100 of the present invention.

Please refer to FIG. 2. The stroller 100 of the present invention further includes an installing base 50 having a front end fixed to the frame 34. A rear end of the installing base 50 is pivotally connected to the assistant wheel 40 so that the assistant wheel 40 is more reliably installed on the frame 34. An engaging slot 51 is formed on the front end of the installing base 50 for engaging the frame 34, and a containing slot 52 is formed on the rear end of the installing base 50 for containing the assistant wheel 40. A portion of the assistant wheel 40 can be pivotally connected to the installing base 50 through a rotary axis (not shown in figures), and another portion of the assistant wheel 40 protrudes outside the containing slot 52. Due to above configuration, the installing base 50 can be mounted on the frame 34 quickly and the assistant wheel 40 can be installed inside the installing base 50 with aesthetic appearance.

The front-wheel assembly 10 can include a plurality of front wheels 11, such as a couple of front wheels 11 pivotally connected to the front-wheel support frame 31. The couple of front wheels 11 can bear a force applied on a front end of the stroller 100 in equilibrium so as to facilitate the stroller 100 to steer. Similarly, the rear-wheel assembly 20 can include a plurality of rear wheels 21, such as a couple of rear wheels 21 pivotally connected to the rear-wheel support frame 32. The couple of rear wheels 21 can bear a force applied on a rear end of the stroller 100 so as to facilitate the stroller 100 to steer.

Please refer to FIG. 1 to FIG. 5. A procedure of folding the stroller 100 is described as follows. First, the operating mechanism 60 is operated to unlock the foldable stroller skeleton 30. Next, the handrail frame 33a is moved in a direction of an arrow C as shown in FIG. 1, the stretchable handle frame 35 is moved in the direction of the arrow D as shown in FIG. 1, and the frame 34 is moved in a direction of an arrow E as shown in FIG. 1, so that the stroller 100 of the present invention is folded as shown in FIG. 4. For drawing back the stretchable handle frame 35, the sliding pillar 37 is moved with the stretchable handle frame 35 to contact the inner wall of the bottom end of the guiding groove 36a so as to move the guiding limiting block 36 close to the handrail frame 33a. As the stretchable handle frame 35 is moved in the direction of the arrow D continuously, the guiding limiting block 36 will contact the handrail frame 33a.

In contrast to the prior art, the frame 34 is pivotally connected to the foldable stroller skeleton 30, and the assistant wheel 40 is pivotally connected to the frame 34 for being capable of contacting the ground by cooperating with the rear-wheel assembly 20 as the frame 34 approaches the rear-wheel assembly 20 by rendering the foldable stroller skeleton 30 folded, in the present invention. This configuration makes the stroller 100 of the present invention be in a standing state so as to facilitate users to take after the stroller 100 is folded. Besides, the assistant wheel 40 is rolling as the stroller 100 is dragged so that users can save more effort to drag the stroller 100. The stroller 100 is standing by the assistant wheel 40 and the rear-wheel assembly 20, instead of a front-wheel assembly and a rear-wheel assembly of a conventional stroller.

Therefore, the stroller 100 of the present invention is smaller than the conventional one after being folded.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller, comprising:
    a foldable stroller skeleton;
    a front-wheel assembly connected to the foldable stroller skeleton;
    a rear-wheel assembly connected to the foldable stroller skeleton;
    a frame connected to the foldable stroller skeleton;
    an assistant wheel pivotally connected to the frame for being capable of contacting a ground by cooperating with the rear-wheel assembly as the frame approaches the rear-wheel assembly by rendering the foldable stroller skeleton folded, and
    an installing base having a front end fixed to the frame, a rear end rotatably connected to the assistant wheel, an engaging slot formed on the front end thereof and a containing slot formed on the rear end thereof, the installing base being fixed to the frame by rendering the frame engaged inside the engaging slot, and the assistant wheel being rotatably connected to the installing base and having a portion accommodated inside the containing slot and another portion protruding outside the containing slot.

2. The stroller of claim 1, further comprising an operating mechanism disposed on the foldable stroller skeleton for unlocking the foldable stroller skeleton prior to rendering the foldable stroller skeleton folded.

3. The stroller of claim 1, wherein the foldable stroller skeleton comprises:
    a handrail frame;
    a seat frame arranged to and cooperated with the handrail frame so as to form a seat area, the frame being connected to the seat frame;
    a front-wheel support frame disposed on a front side of the seat area, the front-wheel assembly being connected to the front-wheel support frame;
    a rear-wheel support frame disposed on a rear side of the seat area, the rear-wheel assembly being connected to the rear-wheel support frame; and
    a stretchable handle frame having a lower portion disposed on the rear side of the seat area and an upper portion extending away from the handrail frame.

4. The stroller of claim 3, further comprising an operating mechanism disposed on the stretchable handle frame for unlocking the foldable stroller skeleton prior to rendering the foldable stroller skeleton folded.

5. The stroller of claim 3, wherein the front-wheel assembly comprises a plurality of front wheels pivotally connected to the front-wheel support frame.

6. The stroller of claim 3, wherein the rear-wheel assembly comprises a plurality of rear wheels pivotally connected to the rear-wheel support frame.

* * * * *